Jan. 24, 1933.  R. VON FROMMER  1,895,057
TOOL HOLDER
Filed April 7, 1931
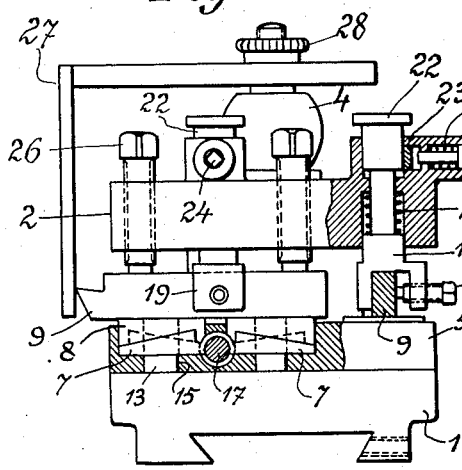
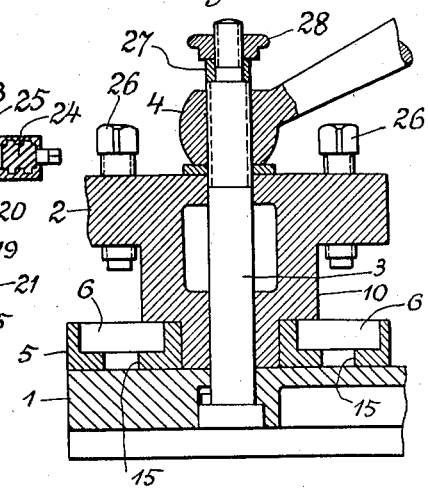
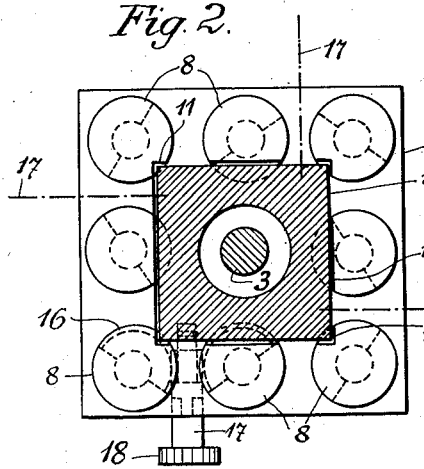
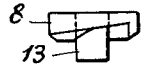
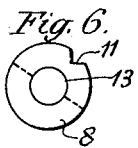
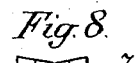
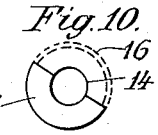
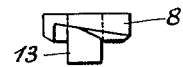
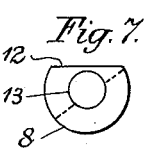
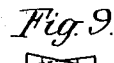
R. Von Frommer
INVENTOR
By: Marks & Clerk
Attys.

Patented Jan. 24, 1933

1,895,057

UNITED STATES PATENT OFFICE

RUDOLF VON FROMMER, OF BUDAPEST, HUNGARY

TOOL HOLDER

Application filed April 7, 1931, Serial No. 528,417, and in Hungary May 20, 1930.

In my U. S. patent application filed on the 6th February 1930 Serial Number 337,956, a tool holder for lathes or like machine tools is described, with which is incorporated a device for raising or lowering the cutting tool with great exactness.

The present invention relates to improvements in tool holders of the type described in my application above referred to.

The tool post or tool holder according to the present invention makes it possible to place several, i. e. four cutting tools into the tool post, allowing at the same time adjustment of the tools to be effected, not only vertically but also angularly in the horizontal plane.

In the accompanying drawing one form of the tool holder according to the present invention is shown by way of example.

Figure 1 is a side elevation of the tool post, partly in section. Figure 2 is a top plan view, partly in section. Figure 3 is a sectional side view after removal of some component parts. Figures 4 and 5 are side views of two parts of the tool post, while Figs. 6 and 7 are the respective bottom plan views. Figures 8 to 11 are similar views of two other parts.

Referring to the drawing, the tool post 2 can be fixed on the support 1 by means of a clamping screw 3 and a nut 4 which is provided with a handle. Under the tool post 2 lies the base 5, which is pressed by the tool post onto the support 1 and is secured in this way. In the base 5 are provided for each of the tools 9 two cylindrical holes 6 (Fig. 3) in which the rings 7, serving for the adjustment in the vertical direction of the edge of the cutting tool are rotatably mounted. These rings have a helical working surface on which the compensating rings 8 bear. Thus, according to the present invention to each of the tools belong two adjusting rings and two compensating rings having helical bearing surfaces, in order to provide for the cutting tools larger and more advantageous bearing surfaces. The adjusting rings 7 are provided, as in the application above referred to, with working faces shaped in the form of a double threaded helical surface (Figs. 8 to 11) while the compensating rings 8 have, according to the present invention, a cylindrical head portion with a plane top surface for bearing the cutting tool and a helical surface below the head portion which is shaped to fit on the helical surface of the respective ring 7.

The tool post 2 is provided with a middle portion 10 which may have a prismatic shape and is adapted to prevent the compensating rings 8 from rotation. To this end the compensating rings situated at the corners of the prism 10 are provided with notches 11 advantageously shaped in a right angle, while the compensating rings touching the prism at its sides are cut at 12 along a chord. The compensating rings 8 are provided at their centre, in order to attain a proper guide, with a projection 13 entering the bore 14 of the ring 7 and the bore 15 of the base 5. The rotation of the rings 7 is effected, as in the application above referred to, by means of worm drives, a worm 17 being rotatably mounted between two of the rings, each provided with teeth 16 meshing with the common worm 17. The latter may be rotated by means of the handle 18. In Figure 2 only one of the worms 17 is shown for the sake of simplicity whilst the other are indicated only by their centre lines. As the rings 7 can be swung with half a rotation at most, owing to the fact that the circumference of the helical working surfaces is semicircular, it is sufficient to provide the teeth 16 on the rings 7 only on one half of their circumference, as is shown clearly on Figures 10 and 11. Due to the arrangement of one single worm 17 for a pair of rings 7, the latter will turn in opposite directions to one another. Consequently it is necessary to construct their helical working faces with opposed inclinations, as is to be seen from Figures 8 and 9. A pair of the rings 7 will thus always raise or lower the cutting tool resting on it, in spite of the opposed direction of turning of the two rings.

In order to secure the cutting tool temporarily and yieldingly during its adjustment in the vertical direction, a fixing or forked member 19 is provided for each of the tools, the members 19 being led in a vertical guide of the tool post 2 and pressed downwardly by springs 20. For securing the tools in the forked members 19, a screw 21 is provided, which presses the tool towards one prong of the fork 19. In order to render the tool adjustable in the horizontal plane, the forked member 19 is rotatable in the tool post 2. To the end of securing the tool after setting it into the proper angle, a brake block 23 is provided at the head portion 22 of the member 19, this brake block being adapted to be pressed against the head 22 by a screw 24 having steep threads. After releasing the screw 24 the same is pushed back by the spring 25 the brake block 23 thus releasing the fixing member 19.

When the desired adjustment of the tool is attained, the same may be secured by the thrust screws 26. The yielding forked member 19 is arranged advantageously between the two thrust screws 26 and is independent of these screws.

In order to facilitate the adjustment of the tool in the vertical direction, a gauge 27 is arranged in the manner indicated in the patent above referred to, that is to say a nut 28 is provided for securing the gauge on the clamping screw 3.

Having now particularly described and ascertained the nature of my said invention and in what manner the same is to be performed, I declare that what I claim is:—

1. A tool holder comprising a support, a tool post adapted to be fixed on said support and to accommodate several tools, a base arranged between the tool post and the support and having a pair of holes for each tool, adjusting rings rotatable in the said holes and having double threaded helical working surfaces, teeth on the circumference of said adjusting rings, a driving worm for each pair of said adjusting rings meshing with said teeth, compensating rings resting on said adjusting rings and having double threaded working surfaces adapted to fit on the working surface of said adjusting rings, a pair of the compensating rings lying under each tool and thrust screws pressing the tools to the compensating rings.

2. A tool holder as claimed in claim 1, comprising spring controlled pressure devices adapted to temporarily and yieldingly secure the tools in the vertical direction.

3. A tool holder comprising a support, a tool post adapted to be fixed on said support and to accommodate several tools, a base arranged between the tool post and the support and having a pair of holes for each tool, adjusting rings rotatable in the said holes and having double threaded helical working surfaces, teeth on the circumference of said adjusting rings, a driving worm for each pair of said adjusting rings meshing with said teeth, compensating rings resting on said adjusting rings and having double threaded working surfaces adapted to fit on the working surfaces of said adjusting rings, a pair of the compensating rings lying under each tool, projections on said compensating rings for guiding them in bores of said adjusting rings and thrust screws pressing the tools to the compensating rings.

4. A tool holder comprising a support, a tool post adapted to be fixed on said support and to accommodate several tools, a base arranged between the tool post and the support and having a pair of holes for each tool, adjusting rings rotatable in the said holes and having double threaded helical working surfaces, teeth on the circumference of said adjusting rings, a driving worm for each pair of said adjusting rings meshing with said teeth, compensating rings resting on said adjusting rings and having double threaded working surfaces adapted to fit on the working surfaces of said adjusting rings, a pair of the compensating rings lying under each tool, cuttings-off on said compensating rings adapted to bear against fixed parts of the tool holder for preventing the rotation of said compensating rings and thrust screws pressing the tools to the compensating rings.

5. A tool holder comprising a support, a tool post adapted to be fixed on said support and to accommodate several tools, a base arranged between the tool post and the support and having a pair of holes for each tool, adjusting rings rotatable in the said holes and having double threaded helical working surfaces, teeth on the circumference of said adjusting rings, a driving worm for each pair of said adjusting rings meshing with said teeth, compensating rings resting on said adjusting rings and having double threaded working surfaces adapted to fit on the working surfaces of said adjusting rings, a pair of the compensating rings lying under each tool, yieldingly fixing members to secure temporarily the tools in the vertical direction, said fixing members being rotatable in the direction of the angular adjustment of the tools, a brake device adapted to prevent an accidental turning of said fixing members and thrust screws pressing the tools to the compensating rings.

In testimony whereof I affix my signature.

RUDOLF v. FROMMER.